Nov. 24, 1925.
W. G. DANIEL ET AL
1,563,169
SHOCK ABSORBER
Filed May 11, 1925
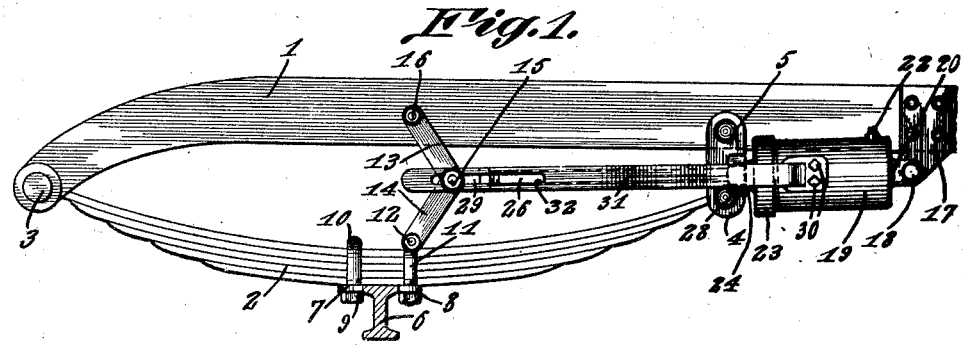
Fig. 1.
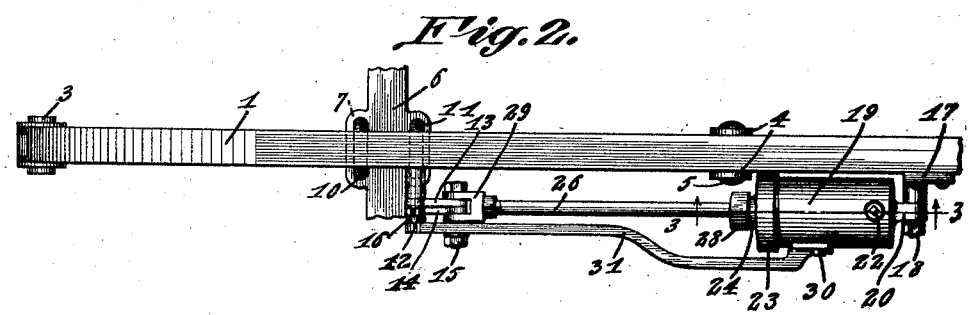
Fig. 2.
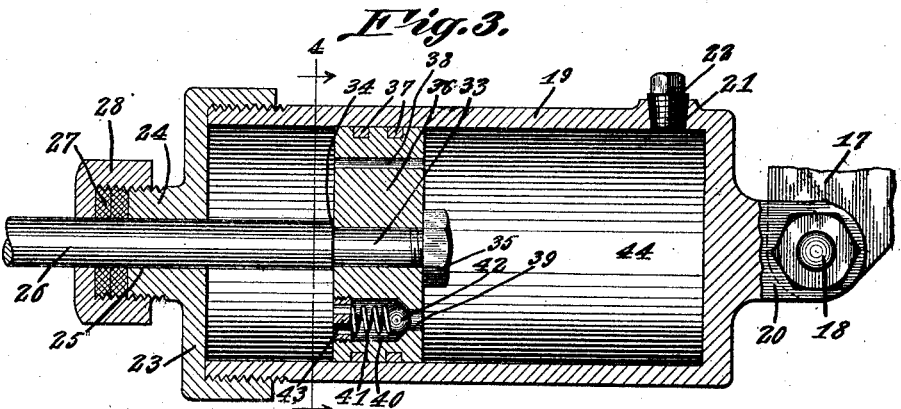
Fig. 3.
Fig. 4.
William G. Daniel INVENTORS
AND N. Rogers,
BY
Geo. P. Kimmel ATTORNEY.

Patented Nov. 24, 1925.

1,563,169

UNITED STATES PATENT OFFICE.

WILLIAM G. DANIEL AND NATHANIEL ROGERS, OF SUNBURST, NORTH CAROLINA.

SHOCK ABSORBER.

Application filed May 11, 1925. Serial No. 29,490.

*To all whom it may concern:*

Be it known that we, WILLIAM G. DANIEL and NATHANIEL ROGERS, citizens of the United States, residing at Sunburst, in the county of Haywood and State of North Carolina, have invented certain new and useful Improvements in Shock Absorbers, of which the following is a specification.

This invention relates to shock absorbers for use in connection with motor vehicles, and has for its object to provide, in a manner as hereinafter set forth, a device of the class referred to, with means for reducing shock to a minimum when the vehicle meets with an obstruction when travelling over an uneven roadbed.

A further object of the invention is to provide, in a manner as hereinafter set forth, a device of the class referred to, with means for cushioning the vehicle spring on the compression and rebound thereof and with the cushioning action applied to the spring on the rebound greater than that applied on compression, under such conditions overcoming the application of sudden shocks to the vehicle and further absorbing shock to a minimum when the vehicle is travelling over an uneven road surface or meets with an obstruction.

Further objects of the invention are to provide; in a manner as hereinafter set forth, a shock absorber, which is simple in its construction and arrangement, strong, durable, compact, thoroughly efficient in its use, conveniently installed, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a shock absorber, in accordance with this invention, showing the adaptation thereof with respect to a vehicle spring and the chassis of the latter.

Figure 2 is a top plan view of the structure shown in Figure 1.

Figure 3 is a section on line 3—3, Figure 2.

Figure 4 is a section on line 4—4, Figure 3.

Referring to the drawings in detail, 1 indicates a portion of one of the side bars of a chassis, 2 a vehicle spring of the laminated type of concave curvature, and which is pivotally connected at its outer end to the outer end of the bar 1, as at 3. The inner end of the spring 2 is pivotally connected, as at 4, to a link coupling 5, which depends from the bar 1. The spring 2 is arranged below the bar 1 and is mounted on, as well as being connected to the vehicle axle 6. The spring 2 can be connected in any suitable manner with the axle 6, and by way of example the axle 6 is formed with a pair of oppositely extending offsets 7 and 8, and to each of which is connected an inverted yoke, by the nuts 9. One of the yokes is indicated at 10 and the other at 11. The yokes surround the spring 2 and the yoke 11 has extending from the top thereof a lateral lug 12, upon which is pivotally mounted the lower lever arm of a pair of toggle lever arms. The lever arms of said pair are indicated at 13, 14, have their opposed ends pivotally connected together by a pivot bolt 15, and the upper arm 13 of the pair is pivotally mounted on a pivot bolt 16, which projects from one side of the bar 1.

Depending from the bar 1, is a hanger member 17, having pivotally connected therewith, as at 18, the rear end of a cushioning fluid containing cylinder 19. The rear end of the cylinder 19 is formed with an integral arm 20, through which the pivot 18 extends. The cylinder 19 is formed with a filling opening 21 closed by a removable plug 22. The cushioning fluid employed is preferably oil, but any suitable fluid can be utilized for cushioning purposes. The cylinder 19 has its forward end open and threadedly engaging with said forward end is a flanged closure cap 23 therefor. The cap 23, centrally of its outer face is provided with a peripherally threaded cylindrical extension 24, and the cap 23 axially thereof is provided with an opening 25 for the passage of a piston rod 26. The extension 24 is somewhat elongated to form a bearing for the rod 26.

Surrounding the rod 26, exteriorly of the extension 24, are packing elements 27 and which are secured in position by a flanged cap 28 threadedly engaging with the extension 24. Secured to the outer end of the piston rod 26 is a yoke-shaped member 29, into which extends the pivoted, opposed ends of the lever arms 13 and 14, and further extending through the arms of the yoke 29 is the pivot bolt 15 and by this arrangement the lever arms 13 and 14 are connected with the piston rod 26 to provide for the reciprocatory movement thereof on the compression and rebound of the vehicle spring.

Secured at one end, by the hold-fast devices 30, to the outer side of the cylinder 19, and projecting forwardly therefrom, is an inset combined guide and supporting bar 31, formed with a lengthwise extending guide slot 32 for the pivot bolt 15, which projects through the slot 32 and is slidably connected to the bar 31.

The inner end of the piston rod 26 is reduced, as at 33, forming thereby a shoulder 34. Threadedly engaging with the reduced end 33 is a securing nut 35, and interposed between the latter and the shoulder 34 and mounted on the reduced portion 33 of the rod 26 is a piston head 36, provided with a plurality of packing rings 37.

The piston head 36 is formed entirely therethrough with a permanently open passage 38, and diametrically opposite said passage the piston head 36 is provided with a port 39, which opens into a socket 40. Arranged within the socket 40 is a spring controlled check valve 41 adapted to engage a seat 42 formed at the inner end of the socket 40 for the purpose of closing the port 39. Secured within the socket 40, at the outer end thereof, is a spider 43 for the purpose of retaining the check valve within the socket. The check valve 41 engages the seat 42 to close the port 39 when the piston head 36 travels towards the outer end of the cylinder 19, but the valve 41 is moved off its seat when the piston head travels in the opposite direction.

When the spring 2 is compressed, the lever arms 13 and 14 move towards each other, thereby shifting the piston head 36 inwardly against the action of the cushioning fluid within the cylindrical chamber 44. As the piston head moves inwardly, the cushioning fluid travels through the passage 38, port 39 and socket 40 into the forward part of the chamber 44, and owing to the action of the piston head 36 in connection with the cushioning fluid, the compression action of the spring 2 is cushioned or retarded. When the spring 2 rebounds the lever arms 13, 14 are extended relatively to each other, whereby the piston head 36 is moved towards the outer end of the cylinder and the cushioning fluid travels through the passage 38 into the rear of the chamber 44, but no passage of the fluid is had through the socket 40 and port 39, due to the fact that the valve 42 has seated to close the port, and by this operation the rebound action of the spring 2 is cushioned or retarded and the cushioning effect applied is greater than that applied to the spring during the compression thereof.

It is thought that the many advantages of a shock absorber, in accordance with this invention, can be readily understood, particularly in view of the fact that the cushioning action applied to the spring on rebound is greater than that applied on the compression of the spring and by this action sudden application of shock is provided and the shock is absorbed, and although the preferred embodiment of the invention is as illustrated and described, yet it is to be understood that changes in the details of construction can be had which will fall within the scope of the invention as claimed.

What we claim is:—

1. A shock absorber comprising a pair of toggle lever arms pivotally connected together and movable towards and away from each other respectively on the compression and rebound of the vehicle spring and further adapted to be pivotally connected with the vehicle body and spring, a cushioning mechanism connected with said arms and operated thereby on the compression and rebound of the vehicle spring, said cushioning mechanism including means for effecting a greater cushioning action on the rebound than on the compression of the vehicle spring, and means connected to said mechanism and projecting forwardly thereof to provide a guide for the pivot between said arms.

2. A shock absorber for vehicles comprising a pair of toggle lever arms pivotally connected together and movable towards and from each other respectively on the compression and rebound of a vehicle spring, means for pivotally connecting one of said arms to the vehicle body, means for pivotally connecting the other of said arms with the vehicle spring, a fluid cushioning mechanism including a piston element provided with a permanently open passage for the travel of the cushioning fluid therethrough when said element shifts on the compression and rebound of the vehicle spring and further provided with a valve controlled means for the passage of the cushioning fluid when the element shifts on the compression of the vehicle spring, and means for connecting said element to the pivot between said lever arms to provide for the operation of the element on the compression and rebound of the vehicle spring.

3. A shock absorber for vehicles comprising a pair of toggle lever arms pivotally connected together and movable towards and from each other respectively on the compression and rebound of a vehicle spring, means for pivotally connecting one of said arms to the vehicle body, means for pivotally connecting the other of said arms with the vehicle spring, a fluid cushioning mechanism including a piston element provided with a permanently open passage for the travel of the cushioning fluid therethrough when said element shifts on the compression and rebound of the vehicle spring and further provided with a valve controlled means for the passage of the cushioning fluid when the element shifts on the compression of the vehicle spring, means for connecting said element to the pivot between said lever arms to provide for the operation of the element on the compression and rebound of the vehicle spring, and means connected to said mechanism and slidably connected to the pivot between said arms to provide a combined support and guide for the pivot.

4. A shock absorber for vehicles comprising a pair of toggle lever arms having their opposed ends pivotally connected together, said arms movable towards and from each other respectively on the compression and rebound of a vehicle spring, means for pivotally connecting one of said arms to the vehicle body, means for pivotally connecting the other of said arms with the vehicle spring, a fluid cushioning mechanism including a piston element provided with a permanently open passage for the travel of the cushioning fluid therethrough when said element shifts on the compression and rebound of the vehicle spring and further provided with a valve controlled means for the passage of the cushioning fluid when the element shifts on the compression of the vehicle spring, and a yoke-shaped member carried by said element, straddling the opposed ends of said arms and connected to the pivot for said ends to provide for the operation of the element on the compression and rebound of the vehicle spring.

In testimony whereof, we affix our signatures hereto.

WILLIAM G. DANIEL.
NATHANIEL ROGERS.